May 29, 1962  J. S. SENEY  3,037,106
HEATING APPARATUS
Filed July 29, 1960
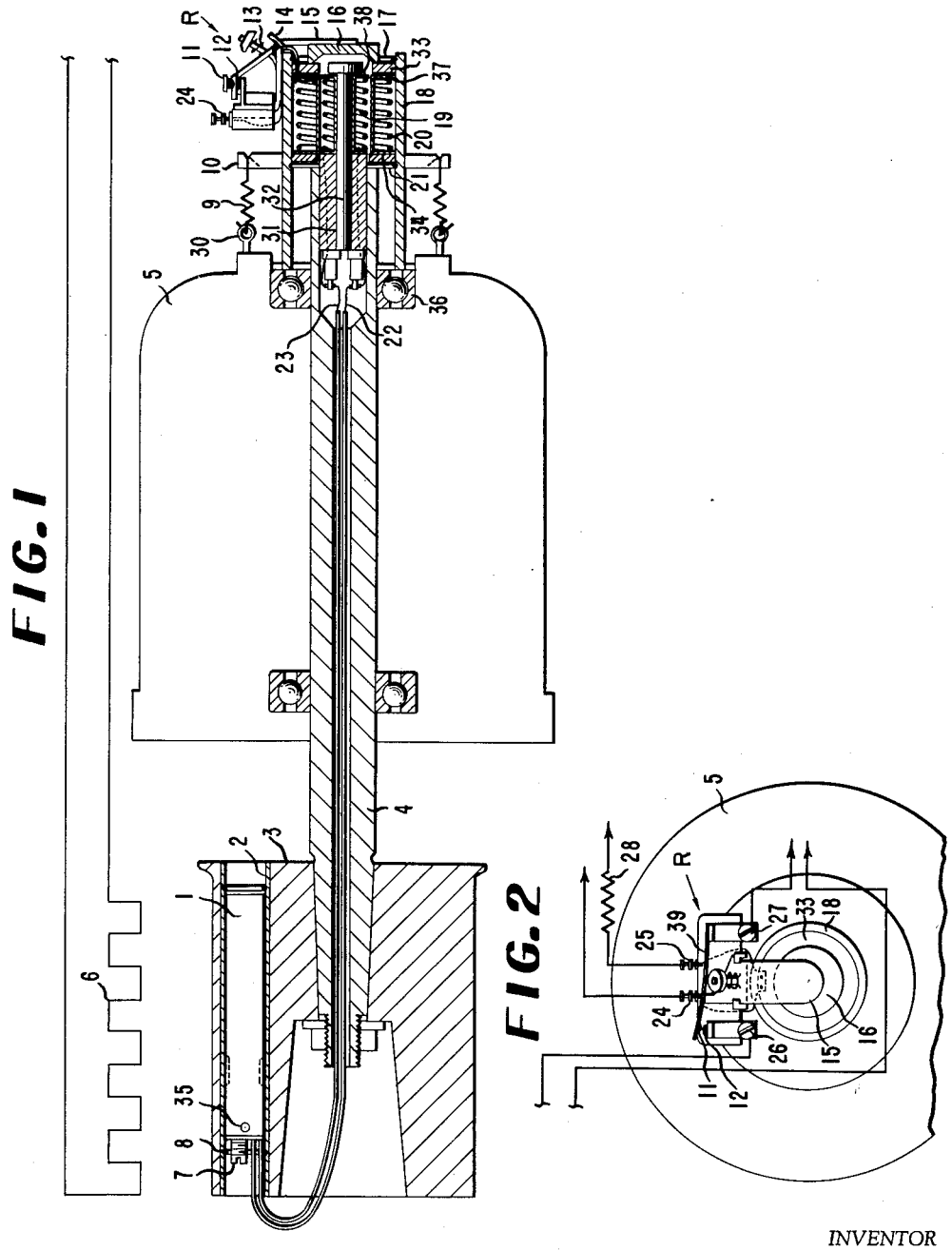
INVENTOR
JOHN SEYMOUR SENEY
BY  *Harry C. Braddock*
ATTORNEY

United States Patent Office 3,037,106
Patented May 29, 1962

3,037,106
HEATING APPARATUS
John Seymour Seney, Seaford, Del., assignor to E. I. du Pont de Nemours and Company, Wilmington, Del., a corporation of Delaware
Filed July 29, 1960, Ser. No. 46,297
2 Claims. (Cl. 219—20)

This invention relates to techniques for transmitting signals, such as those originated by a heat-sensitive switch or thermostat, from a rotating assembly to a stationary position without slip rings or frictional contact devices. More specifically this invention involves sensing and controlling the temperature of rotating heated roll members used in treatment of strand material such as textile yarns and filaments. This invention can be used advantageously with any apparatus in which signals are required to be transmitted from a rotating element to a physically and electrically separated position.

It is one object of this invention to provide a compact, simple, yet reliable arrangement for detecting changes in a given condition on a moving member, creating a signal at a stationary point adjacent the moving member in response to changes in the condition, and using this signal to actuate control devices in such a way as to maintain the given condition at a desired level.

It is another object of this invention to provide an improved effective system for sensing changes in the temperature of rapidly rotating hot roll elements used in the treatment of textile yarns, and at a stationary position adjacent such roll elements generating a signal responsive to the changes for use in controlling the element temperature by regulation of heating apparatus.

Other objects and advantages will appear from a consideration of the following specification, claims, and the accompanying drawings, in which:

FIGURE 1 is a longitudinal cross sectional view of a motor driven heated roll apparatus embodying this invention with the heater control arrangement shown partly schematically.

FIGURE 2 is an end view of the apparatus shown in FIGURE 1 to more clearly illustrate other aspects of the heater control arrangement.

Generally speaking, the improved system of my invention involves the installation of a normally closed heat-sensitive switch on a rotating hot roll assembly and connecting this switch across the secondary winding, also mounted on the rotating assembly, of a transformer arrangement. The primary winding, positioned on stationary structure and arranged to be inductively coupled to the secondary winding, is connected to a source of alternating current power. A spring-biased movable permeable element, or armature, is mounted adjacent the windings and is connected to actuate a switch device controlling power to a heater unit which is positioned to supply heat to the rotating assembly. The permeable element is positioned and arranged with respect to the primary winding so that it is moved to actuate the switch device in response to the increase in intensity of the magnetic field created by energization of the windings by the power source. When the heater is energized and the assembly temperature rises above the desired control temperature, the heat-sensitive switch moves to the open or "hot" position. This places the secondary winding of the transformer arrangement in "open-circuit" condition and the alternating current in, and the magnetic field created by, the primary winding will be sufficient to move the permeable element against spring force to actuate the switch device controlling the heater unit so that heat to the rotating roll assembly is cut off. As the temperature of the assembly drops, the heat-sensitive switch will move toward the closed position. Upon reaching a temperature slightly below the desired temperature for the assembly, the heat-sensitive switch will reach the closed position and in effect short circuit the secondary winding of the transformer arrangement. This action, or load increase will reduce the current in the primary winding and also the intensity of the alternating magnetic field associated with the transformer windings to the point where the spring biasing the permeable element will overcome the field attraction and actuate the switch device controlling the heater unit to initiate the supply of heat to the roll assembly, and bring the temperature back to the control temperature. As can be readily understood, this arrangement provides a very compact, simple, economical, and effective way of controlling the rotating roll assembly temperature in a situation where a signal must be transmitted from the rotating assembly to stationary structure without frictional or other contact.

The preferred embodiment of my invention will now be described in detail and its operation also discussed.

Referring to the figures of the drawing, the preferred embodiment of my invention is shown, in which a rotating hot roll 3 is secured to a hollow drive motor shaft 4 of drive motor 5 and is heated externally by a heater 6, which may be of the electrical resistance type. Inserted in a cylindrical cavity parallel to the roll axis is a copper tube 2 containing a thermal-sensitive switch or thermostat 1. Thermostat 1 is oriented in the cavity by a keyway-engaging pin 35 (keyway not shown) so that the gravity-sensitive plane of the thermostat is perpendicular to the radius of the roll 3. This prevents the forces of rotation from affecting the thermostat action. Thermostat or thermal-sensitive switch 1 is secured in place in tube 2 by C-rings 8. Theaded element 7 is used to adjust the temperature control point of thermostat 1. Thermostat 1 may be of the bimetallic arm type arranged preferably to close its contacts in the "cold" condition. The roll 3 is suitably counterbalanced to compensate for any off center condition caused by thermostat 1.

Elongated hollow cylindrical housing 18 contains the heater controlling relay and is secured to the end of the motor housing 5 by a plurality of springs 9 acting on post elements 10 and eyelets 30. Housing 18 is centered on the inner bore of the outer race of ball bearing 36, and an alignment portion of housing extends into the bearing a small distance.

Mounted inside housing 18 is stationary coil winding 20 wound on a bobbin 37 of insulating material such as nylon, and contained axially between two stationary pole pieces 33 and 34. This entire assembly is held in position by C-rings 17 and 21. A relay assembly R is mounted externally on housing 18 and is provided with terminals 24 and 25, stationary contact 12, movable contact 11 supported on spring arm 39, pivot points 14 on which is mounted pivotable arm 15 to which is secured the permeable element or armature plate 16. Arm 15 is urged by spring 13 toward a position which causes contacts 11 and 12 to be closed. The action of spring arm 39 and spring 13 keeps arm 15 and armature plate 16 away from stationary pole piece 33, in which position the contacts 11 and 12 are closed.

A rotating secondary coil winding 19 is wound upon an insulating bobbin 38 which in turn is supported by a soft iron pole piece 32 and iron bushing 31 both of which are carried by the motor shaft 4. Winding 19 is connected through leads 22 and 23 extending through the interior of hollow shaft 4 to the contacts of thermostat 1 (not shown). The primary coil winding 20 is connected through terminals 24 and 25 to an alternating current power supply. Power, preferably 110 volt, 60 cycle alternating current, is supplied to heater 6 through terminal 27, spring arm 39 to movable contact 11, through stationary contact 12 and terminal 26, through heater 6 and back to the power supply.

In operation, if it be assumed that the system is energized and the roll assembly is in the "cold" condition with its temperature below the desired control temperature, the thermostat 1 will be in the closed position completing a circuit through the secondary winding 19. With the secondary winding in this condition the current in the primary winding is reduced and the flux field of the transformer likewise reduced, over the "open circuit" secondary condition, to the point where the permeable element or armature 16 cannot be held against pole piece 33 by magnetic forces opposing the action of spring 13. Movement of the armature 16, and pivoted arm 15 to which it is secured, under action of spring 13, closes contacts 11 and 12 which energize the heater 6 which will cause a rise in temperature of the roll assembly. When the increasing roll assembly temperature reaches the desired control temperature the thermostat switch 1 will open to break the circuit through the secondary winding 19. The increase in current in the primary winding 20 and attendant increase in the magnetic field associated with the primary winding due to the removal of the load on the transformer, increases the attraction of armature 16 for pole piece 33 to the point where the armature 16 moves into engagement with the pole piece 33 to move the pivoted arm 15 and open contacts 11 and 12 against the action of spring 13 which action de-energizes heater 6. As the roll assembly cools down the thermostat 1 will again close to complete the circuit across the secondary winding 19 which will result in the re-energization of the heater as discussed above to continue the cycling and maintain the temperature of the roll assembly at the desired level.

It will be seen that this embodiment of my invention represents a compact, simple arrangement for achieving effective temperature control of rotating elements, an arrangement which can easily and economically be added to existing equipment and be easily maintained as well.

In accordance with the patent statutes, I have described in detail a preferred embodiment of my invention. Modifications may occur to persons skilled in the art without departing from the spirit and scope of the invention as defined in the following claims.

I claim:

1. A heater control apparatus for maintaining a rapidly rotating assembly at an elevated temperature, said apparatus comprising a rotatable assembly, a stationary heater unit positioned in operative relation to said assembly, a first moving electrical circuit arrangement mounted on said rotatable assembly, said first circuit arrangement comprising a first switch mechanism, a heat sensitive device cooperating with said switch mechanism to actuate the same between an open circuit position and a closed circuit position, and a first winding connected across said switch mechanism, a second stationary independent electrical circuit arrangement separate from said first circuit arrangement mounted adjacent said rotatable assembly and comprising a second winding inductively coupled with said first winding and connected to an alternating current power source, movable element positioned adjacent said windings and connected to a second switch mechanism, said second switch mechanism arranged to control input power to said heater unit, said movable element comprising a portion responsive to the electromagnetic field of said windings and arranged to actuate said second switch mechanism to control the heater unit in response to operation of the first switch by said heat-sensitive device so that the temperature of the said assembly is maintained at the desired level.

2. An improved apparatus for maintaining a moving rotating textile yarn treating roll assembly at a desired temperature, comprising a fixed supporting frame structure, a roll assembly rotatably mounted in said frame structure, a heater unit structure mounted in said frame structure and arranged to supply heat to said assembly, a control means for said heater unit, means for actuating said control means comprising a first stationary inductive winding supported by said frame structure adjacent said assembly, a source of alternating current power operatively connected to said winding, a magnetically permeable movable element mounted adjacent said first winding on said frame structure in position to be acted upon by the magnetic field created by said first winding and operatively connected to said control means for movement between a first heater unit energizing position and a second heater unit de-energizing position in response to the change in magnetic field intensity caused by energization and de-energization of said first winding, a resilient means supported by said frame structure acting upon said permeable element to oppose its movement from one position to the other caused by the magnetic field of said first winding, a second rotating inductive winding positioned on said moving roll assembly and coupled with said first winding, a heat-responsive switch unit mounted on said roll assembly and connected in a circuit across said second winding and arranged to abruptly vary the current in said first winding and consequently abruptly vary the intensity of the magnetic field created by said first winding to cause movement of said permeable element under action of said resilient means during energization of said first winding to actuate said heater unit control means and supply heat to the assembly to maintain the desired temperature thereof.

References Cited in the file of this patent
UNITED STATES PATENTS

| | | |
|---|---|---|
| 2,074,455 | Carleton | Mar. 23, 1937 |
| 2,222,817 | Kline et al. | Nov. 26, 1940 |
| 2,785,873 | Holmes et al. | Mar. 19, 1957 |